US 11,164,090 B1

United States Patent
Pautet

(10) Patent No.: US 11,164,090 B1
(45) Date of Patent: Nov. 2, 2021

(54) TIME-BASED AGGREGATION TO FEED A RETE ENGINE

(71) Applicant: TIBCO Software Inc., Palo Alto, CA (US)

(72) Inventor: Laurent Pautet, Miribel (FR)

(73) Assignee: TIBCO SOFTWARE INC., Palo Alto, CA (US)

( * ) Notice: Subject to any disclaimer, the term of this patent is extended or adjusted under 35 U.S.C. 154(b) by 1019 days.

(21) Appl. No.: 14/925,903

(22) Filed: Oct. 28, 2015

Related U.S. Application Data

(60) Provisional application No. 62/073,231, filed on Oct. 31, 2014.

(51) Int. Cl.
*G06N 5/02* (2006.01)
*G06F 9/54* (2006.01)

(52) U.S. Cl.
CPC .............. *G06N 5/025* (2013.01); *G06F 9/542* (2013.01)

(58) Field of Classification Search
CPC ........ G06N 5/025; G06F 11/079; G06F 9/542
See application file for complete search history.

(56) References Cited

U.S. PATENT DOCUMENTS

| | | | | |
|---|---|---|---|---|
| 2009/0327199 A1* | 12/2009 | Weber | ................... | G06N 5/025 706/48 |
| 2011/0040709 A1* | 2/2011 | Proctor | ................... | G06N 5/02 706/12 |
| 2013/0066866 A1* | 3/2013 | Chan | ................... | G06F 16/2477 707/732 |
| 2014/0230062 A1* | 8/2014 | Kumaran | .............. | G06F 21/554 726/24 |
| 2014/0245374 A1* | 8/2014 | Deerman | ................ | H04L 63/20 726/1 |

OTHER PUBLICATIONS

Karen Walzer, Matthias Groch, and Tino Breddin, "Time to the Rescue—Supporting Temporal Reasoning in the Rete Algorithm for Complex Event Processing", 2008, DEXA 2008, LNCS 5181, pp. 635-642. (Year: 2008).*

Quanlong Li, Yan Jin, Ting He, Hanchuan Xu, "Smart Home Services Based on Event Matching", Jul. 2013, 2013 10th International Conference on Fuzzy Systems and Knowledge Discovery (FSKD), pp. 762-766. (Year: 2013).*

* cited by examiner

Primary Examiner — Kamran Afshar
Assistant Examiner — Ying Yu Chen
(74) Attorney, Agent, or Firm — McGuireWoods LLP

(57) ABSTRACT

Techniques to correlate event data are disclosed. In various embodiments, an aggregation engine is used to correlate event data received from one or more source systems based on one or more correlation rules. An event group comprising at least a portion of said correlated event data is generated programmatically and is asserted as a fact in a working memory of a Rete engine configured to apply one or more Rete rules to facts in the working memory.

20 Claims, 6 Drawing Sheets

TIME-BASED AGGREGATION TO FEED A RETE ENGINE

CROSS REFERENCE TO OTHER APPLICATIONS

This application claims priority to U.S. Provisional Patent Application No. 62/073,231 entitled TIME-BASED AGGREGATION TO FEED A RETE ENGINE filed Oct. 31, 2014 which is incorporated herein by reference for all purposes.

BACKGROUND OF THE INVENTION

RETE algorithms are good at capturing facts and inferring other facts according to rules. However when it comes to events generated by applications, network devices, security components, embedded systems, etc., the amount of data to ingest (e.g., hundreds of thousands of events per seconds) may far exceed what a RETE engine (or other state based rule engine) can support. Conventional RETE engines may be more suited to analyzing "snapshots" or other static views of a system state, and not with a dynamic flow of data.

Aggregation engines for streams are good at reducing the order of magnitude of the number of events to process, by grouping events with similar characteristics. However their true "correlation" capabilities are limited when it comes to making links among the different groups they produce, the best option being usually to stack aggregation engines layers on top of each other.

BRIEF DESCRIPTION OF THE DRAWINGS

Various embodiments of the invention are disclosed in the following detailed description and the accompanying drawings.

DETAILED DESCRIPTION

Figure 1:
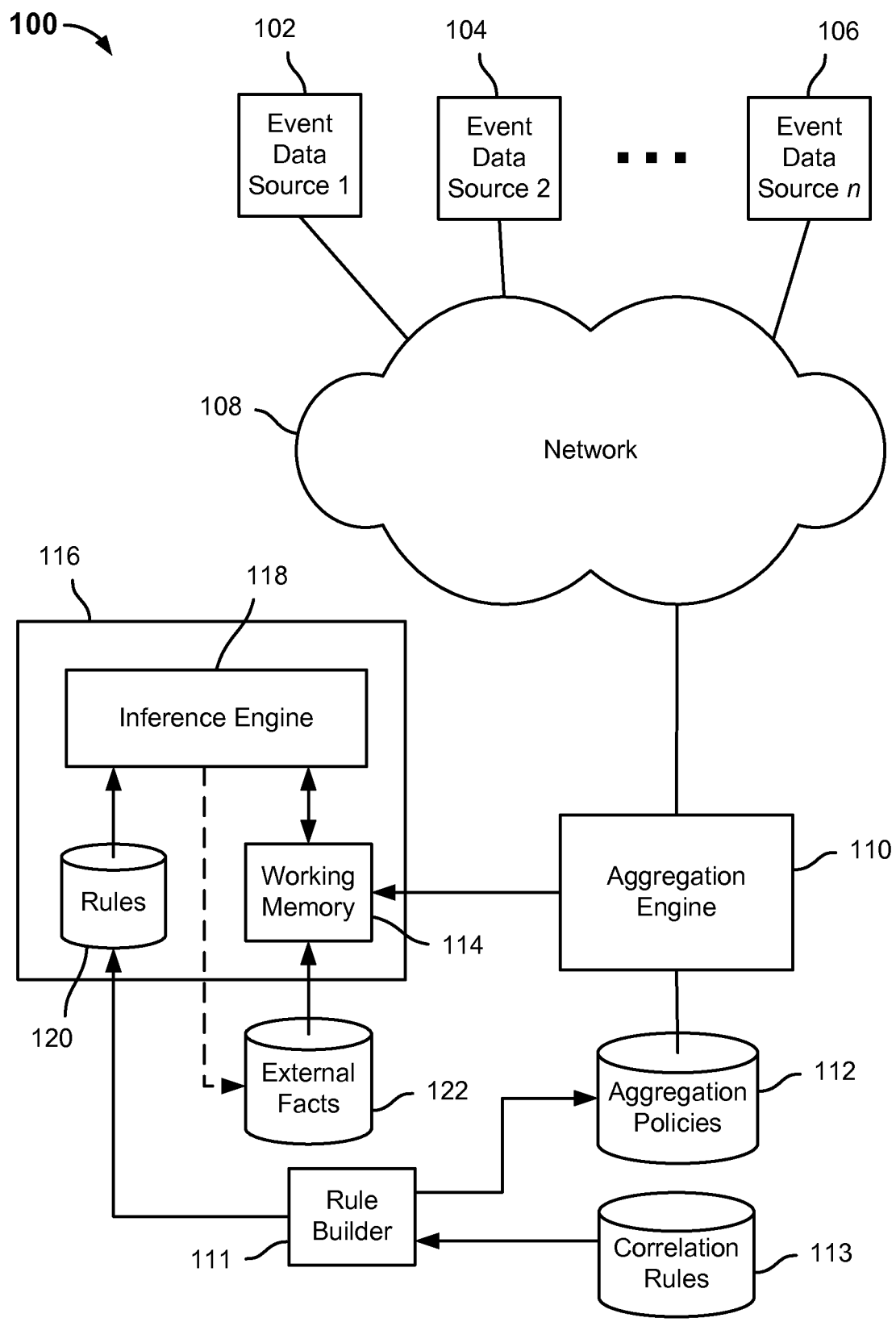
FIG. 1 is a block diagram illustrating an embodiment of a correlation system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Combining a Rete engine (or other state based rule engine) and an aggregation engine into a single correlation system is disclosed. In various embodiments, Rete algorithms are used not to work (solely) on static facts, but (also) on event groups, which may be changing in time. An aggregation engine receives event streams and generates event groups by applying user-defined correlation rules. Event groups are asserted to the working memory of a Rete engine configured to apply associated rules to facts the event groups and other facts in the working memory. A mechanism is provided to reflect updates on event groups to the Rete working memory. In various embodiments, Rete rule actions also may have an effect on some elements of the event groups, enabling both sides (Rete and aggregation) to interact in both directions.

In various embodiments, a reference clock may be modeled in the system. Events and/or event data extracted therefrom may be timestamped, e.g., by the source system that sent the event and/or upon receipt. Timestamps may be used to determine based on a rolling window size how long to keep event data and/or to reorder events received out of order.

In various embodiments, the Rete working memory may also be populated by data outside the flow of events (contextual data), coming for example from databases, directory services, or any other source of enrichment data. By action of a Rete rule, the status of these contextual data may be altered, for example to reflect a new state of the health, status, vulnerability, suspiciousness of a given element. This can itself trigger a new rule.

FIG. 1 is a block diagram illustrating an embodiment of a correlation system and environment. In the example shown, correlation system and environment 100 includes a plurality of event (or other data stream) reporters, represented in FIG. 1 by event data sources 102, 104, and 106. Examples of event sources include, without limitation, an installed base of computer system and/or other equipment configured to log system information locally and report, e.g., periodically, as events occur, etc., to a remote correlation system, e.g., via network communications sent via network 108, such as the Internet and/or one or more private networks.

Events reported (e.g., streamed) by event reporters such as sources 102, 104, and 106 are received via network 108 at an aggregation engine 110. In the example shown, aggregation engine 110 applies aggregation policies 112 to aggregate event data into event groups. In various embodiments, an event group may comprise a data structure in which event data from one or more events received at aggregation engine 110 have been determined to be related at least in part by applying an aggregation policy comprising aggregation policies 112. In the example shown, a rule builder module 111 parses and interprets user-defined correlation rules 113 to generate aggregation policies 112 programmatically.

In various embodiments, a proprietary, standards-based, and/or other constraint based language may be defined and provided to enable users to express relationships between events and event groups. In various embodiments, the constraint based language may be used by a user to define correlation rules, such as correlation rules 113 in the example shown. In various embodiments, aggregation policies 112 derived programmatically from correlation rules 113 may be used to identify specific activities within a flow of events. Traditional query languages focus on describing a set of constraints for creating a single group of events, usually in the form of a data table. This does not enable to describe complex articulation of several event groups that goes beyond a simple join. On the other side, traditional pattern matching languages focus on the sequencing of events, but don't offer rich capabilities in terms of grouping events together, moreover they often requires a precise ordering in the sequencing of events to be described.

In various embodiments, a constraint based language may be provided to enable a user to describe various patterns of actions that one may want to track in a flow of events, either in real time or from an historical set of data. The language in various embodiments may be used to describe the characteristics of the sequences of events which are to be found in a flow of events. The language may include rules, each of which may define a temporal window, either sliding or fixed. The rules themselves may be structured around the notion of event groups, each of which may contain one or more of the following:
  Filtering clause,
  Grouping clause,
  Having clauses (conditions using aggregation functions)
  Correlation constraints, which could be, for example:
    Joins between event groups (one or more fields being equal among event groups)
    Sequencing constraints base on the relative start/end dates of event groups
    Free form constraints, as any condition on grouping fields, or aggregation fields of the event group In some embodiments, each event group itself can be part of a rule in three ways: as a mandatory item, as an optional item, or as an exclusion item which occurrence inhibits the rule from triggering.

In various embodiments, aggregation engine 110 may implement sliding and/or other windows, e.g., as specified in correlation rules 113 and/or embodied in aggregation policies 112, at least in part by storing in temporary data structures event data that partly satisfies an aggregation policy embodying a correlation rule but which depends on other event data to fully satisfy the rule. For example, a correlation rule may be defined to generate an alert if a prescribed number of failed sign in attempts are associated with a same IP (or other) address within a specified time period. A first failed attempt may result in a temporary tracking data structure being instantiated and populated with data reflecting the failed sign in attempt and an associated time. Subsequent attempts reported during the prescribed time window may be added to the data structure, and an event group generated if the prescribed number of failed sign in attempts are determined to have occurred within the prescribed window. If instead the prescribed amount of time has passed before the prescribed number of failed sign in attempts is reached, at least event data for the first-detected failed attempt may be removed from the data structure.

In some embodiments, a similar approach may be used to allow for the possibility that event data for a condition precedent may, e.g., due to network delay, arrive at aggregation engine 110 subsequent to receipt of event data for which the first-mentioned data satisfies the condition precedent. For example, a correlation rule may specify as condition that event A occurs first followed by event B affecting the same system, user, resource, etc. In some embodiments, a received instance of event B may result in associated event data being retained in a temporary data structure, e.g. for a relatively short time, to see if a corresponding occurrence of event A occurred before the occurrence of event B but the reported event data of which (i.e., of event A) was received later than the event data for event B.

Referring further to FIG. 1, in the example shown aggregation engine 110 is configured to assert event groups generated programmatically by aggregation engine 110 by applying aggregation policies 112 as facts in a working memory 114 of a Rete-based expert system 116. Rete-based expert system 116 includes an inference engine 118 configured to use a Rete algorithm to identify facts in working memory 114 that satisfy Rete rules 120.

In various embodiments, the Rete rules 120 may be derived from user defined correlation rules, as in the example shown, in which rule builder 111 derives at least a subset of Rete rules 120 based on correlation rules 113.

In various embodiments, each rule in Rete rules 120 may include one or more conditions which may be determined to be satisfied by facts in working memory 114, and one or more actions to be taken based on a determination that said one or more conditions have been determined to have been met. Example of actions include, without limitation, generating an alert or other notification, isolating an affected system or set of systems (e.g., in the case of an intrusion detection or other security-related rule), and/or generating additional and/or modified facts to be asserted in working memory 114.

In the example shown, working memory 114 may include facts in addition to event groups generated by aggregation engine 110, such as external facts 122. Examples of external facts 122 may include, without limitation, security or other state information relating to event data sources such as 102, 104, and 106; other context or state information; and global security state or other information. In the example shown in FIG. 1, a Rete rule action may include updating an external fact 122, e.g., a security state of a system and/or a global security state or other context variable.

In various embodiments, facts asserted in working memory 114 may be updated other than as a result of an action taken by inference engine 118 based on a Rete rule 120. For example, in some embodiments, event group information as stored in working memory 114 may be read and/or updated by aggregation engine 110, e.g., based on subsequently received event data. For example, in some embodiments, each time a new event that satisfies any applicable filtering condition is received, changes in the Rete network algorithm may be triggered, e.g., either by creating one or more new facts (e.g., new event group, or added to an existing event group), or by updating the content of an existing one (e.g., adding a new reference, changing values of the computed aggregation functions there may be, etc.).

Figure 2:
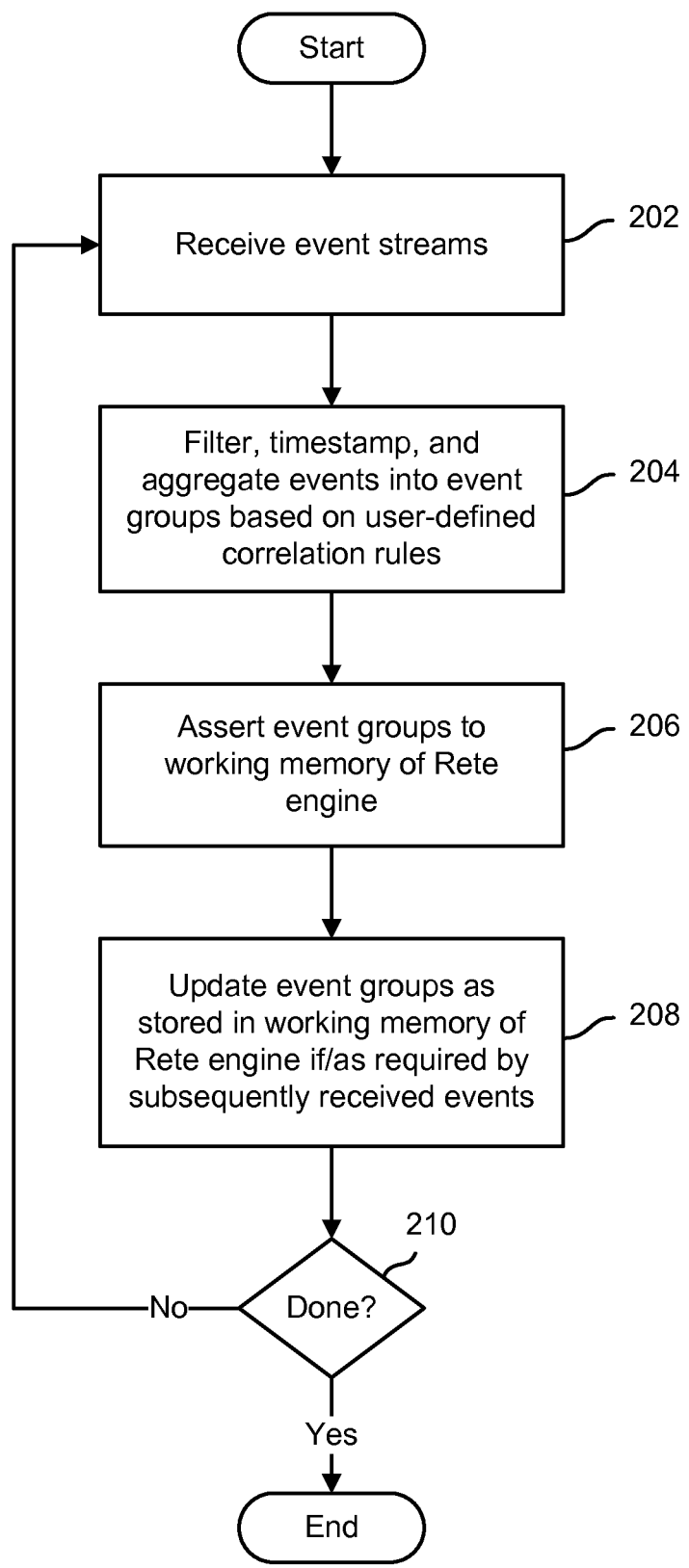
FIG. 2 is a flow chart illustrating an embodiment of a process to aggregate event stream data to populate a working memory.

FIG. 2 is a flow chart illustrating an embodiment of a process to aggregate event stream data to populate a working memory. In various embodiments, the process of FIG. 2 may be implemented by an event aggregation engine, such as aggregation engine 110 of FIG. 1. In the example shown, event streams are received, e.g., via network communications (202). Event streams are parsed to extract event data, which may be filtered (e.g., to ignore events not associated with a correlation rule and/or aggregation policy), time-stamped (e.g., if not already bearing a timestamp from the originating system), and aggregated into event groups based on user-defined correlation rules (204). Event groups are asserted as facts in the working memory of an associated Rete engine (206), such as working memory 114 of FIG. 1. Event groups are updated dynamically in place (i.e., as stored in the working memory) if/as required by subsequently received events (208). The processing of received event streams continues (202, 204, 206, and 208) until done (210), e.g. the aggregation system is taken offline for maintenance, etc.

Figure 3:
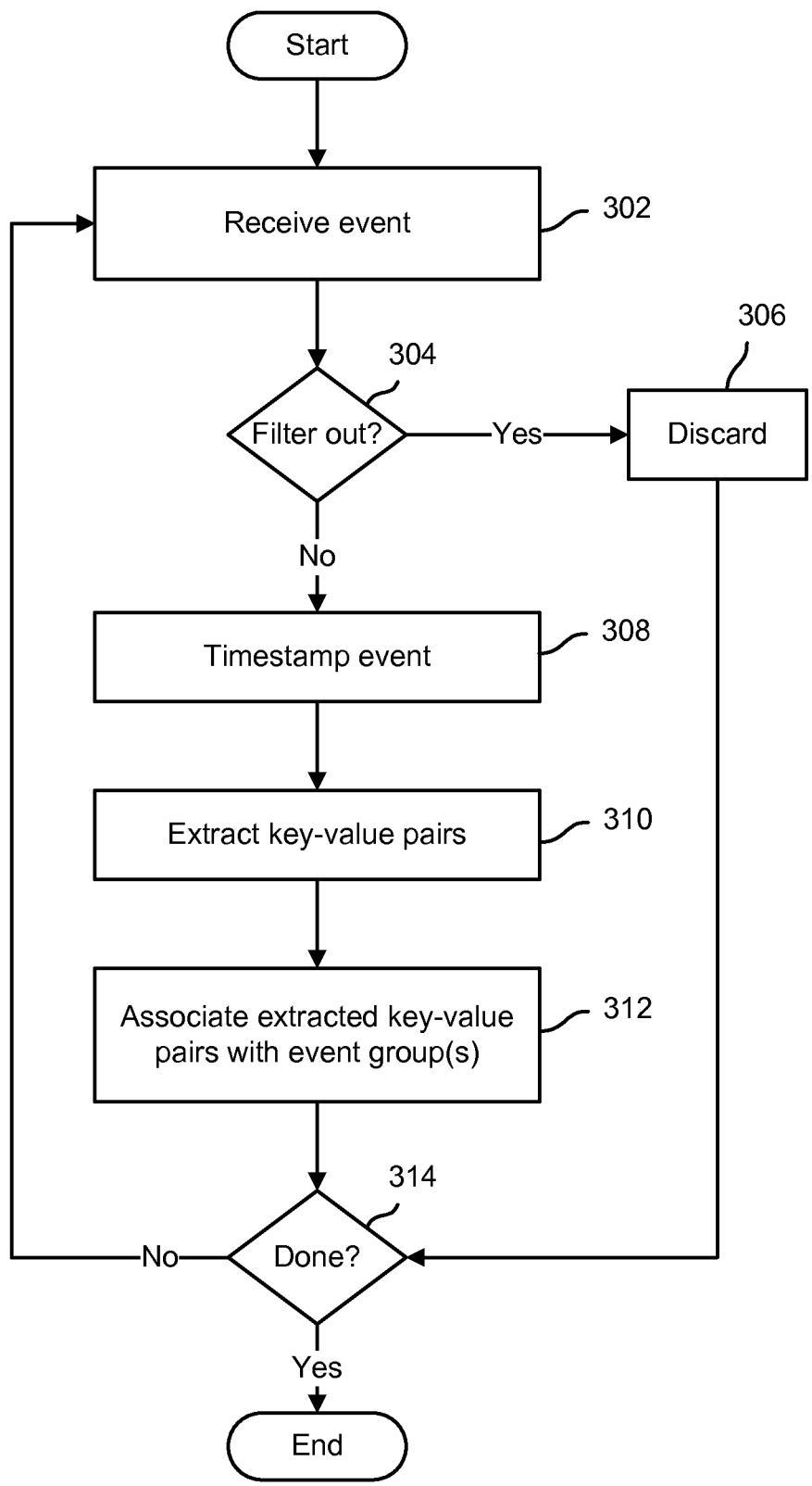
FIG. 3 is a flow chart illustrating an embodiment of a process to create event groups based on event stream data.

FIG. 3 is a flow chart illustrating an embodiment of a process to create event groups based on event stream data. In various embodiments, the process of FIG. 3 may be used to implement one or more of steps 202, 204, and 206 of FIG. 2. In the example shown, as each event is received (302) a determination is made whether to filter the event out from further processing (304), in which case the event is discarded (306). In various embodiments, an event may be filtered based on an affirmative directive (e.g., correlation rule specifies that events of a particular type and/or from a particular source should be ignored) and/or based on a determination that the event does not include any data that is currently or expected to potentially to become relevant to any applicable aggregation policy. If the event is not filtered (304), the event (and/or data comprising the event) is timestamped (308), e.g., using a reference clock provided for the purpose. In some embodiments, the timestamp may be used to implement sliding and/or other time windows, which may be specified in applicable correlation rules. Key-value pairs of event data are extracted from the event (310). For example, event attributes associated with an event group or other entity or data structure as defined by one or more correlation rules may be extracted and stored. In some embodiments, extracting and storing only relevant portions event data as key-value pairs enables the bulk, long term storage of massive amounts of event stream data to be avoided. Extracted key-value pairs of event data are associated with applicable event group(s) (312). For example, a new event group may be instantiated and populated with the extracted values, or an existing event group, as stored at the aggregation engine and/or in the working memory of the Rete engine, may be updated. The process is repeated for each subsequently received event (314) until done, e.g., the system is taken offline for maintenance.

Figure 4:
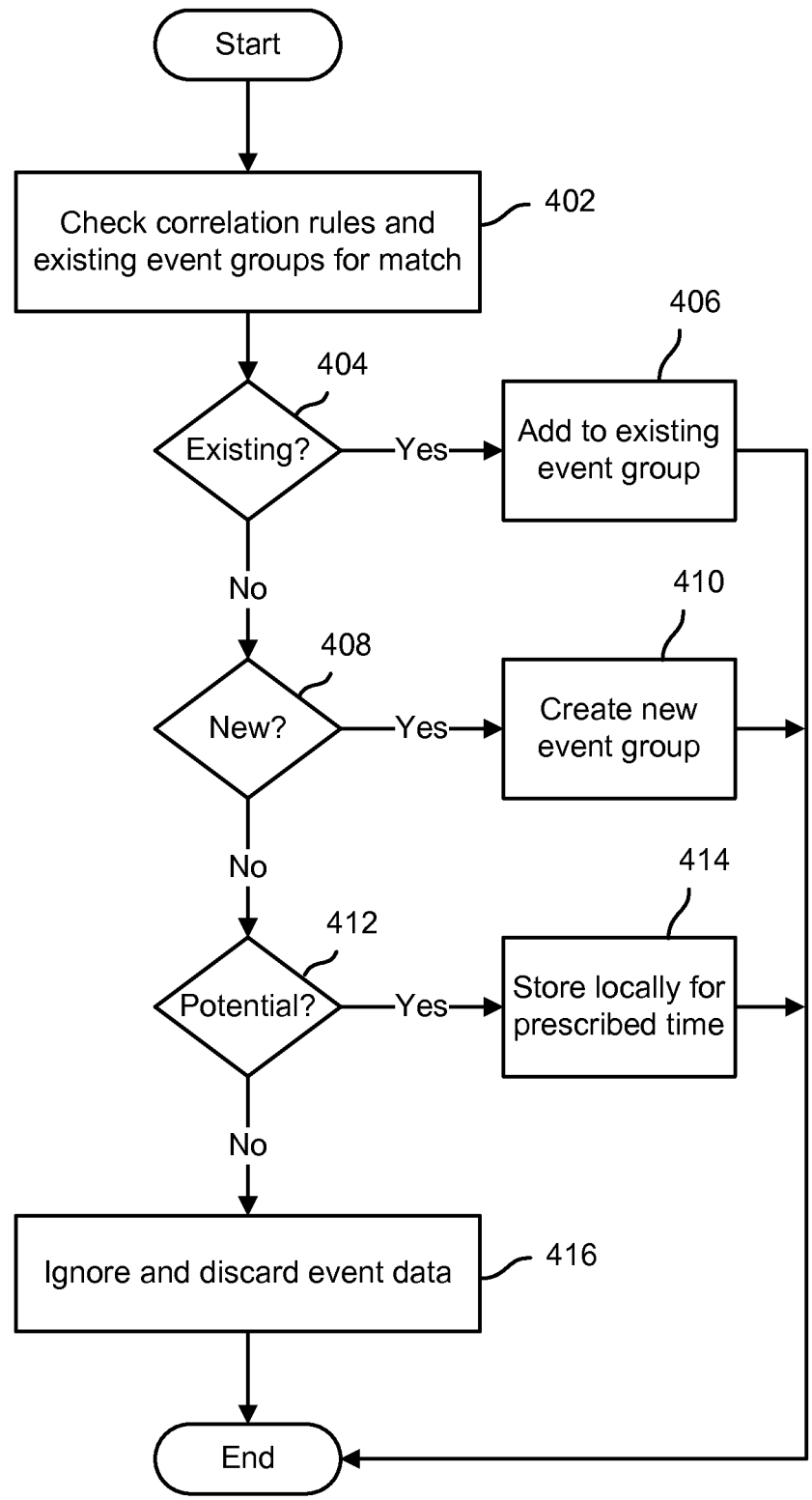
FIG. 4 is a flow chart illustrating an embodiment of a process to associate event stream data with event groups.

FIG. 4 is a flow chart illustrating an embodiment of a process to associate event stream data with event groups. In various embodiments, the process of FIG. 4 may be used to implement step 312 of FIG. 3. In the example shown, event data, e.g., extracted key-value pairs of event data, is checked against potentially applicable correlation rules and/or against existing, pending, and/or partially populated event groups to determine if any match for the event data is found (402). If a match to an existing event group if found (404), the existing event group is updated to reflect the event data (406). If a match to a correlation rule for which an associated event group has not yet been instantiated is found (408), a new event group is created and updated to reflect the event data (410). If the event data does not fully match a correlation rule but partially fulfills the conditions of such a rule, and if the rule contains a sliding or other time window and/or the system is otherwise configured to preserve the event data long enough to determine if other event data satisfies any remaining conditions (412), then the event data is store locally (e.g., in a table or other temporary data structure) (414), e.g., for a prescribed time. If no match to any existing, new, or potential event group is found (404, 408, and 412), the event data is ignored and discarded (416) and the associated iteration of the process of FIG. 4 ends.

Figure 5:
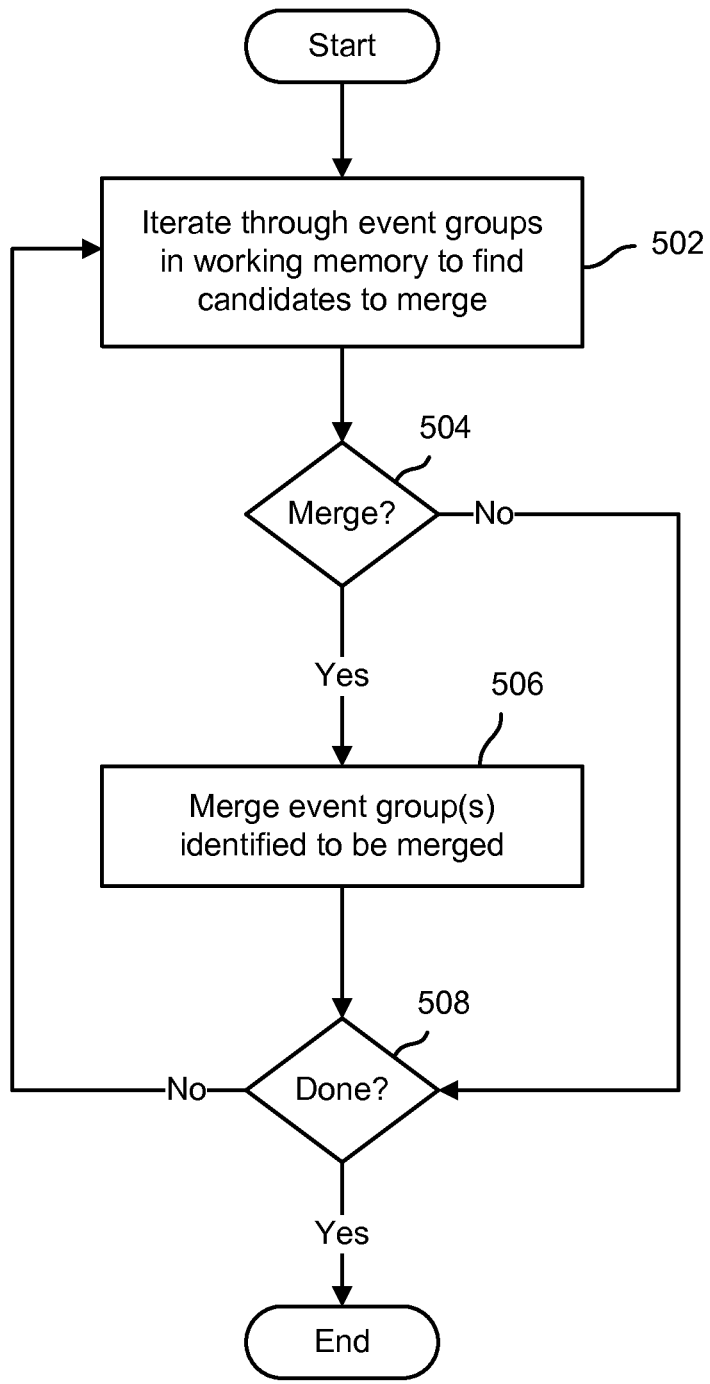
FIG. 5 is a flow chart illustrating an embodiment of a process to merge event groups.

FIG. 5 is a flow chart illustrating an embodiment of a process to merge event groups. In various embodiments, the process of FIG. 5 may be performed with respect to event groups that have been asserted as facts in a working memory of a Rete engine, such as working memory 114 of FIG. 1. In the example shown, event groups in the working memory are iterated through to identify candidates to be merged (502). In some embodiments, correlation rules, such as aggregation policies 112 of FIG. 1, and/or Rete rules, such as rules 120 of FIG. 1, may include merger rules and/or criteria based on which subsequently instantiated event groups may be merge. For example, a correlation rule may indicate that an event group should be generated if n failed log in attempts are detected from the same IP address in a prescribed window. Subsequently, the aggregation engine may create two separate event groups based on the same rule for the same IP address, e.g., a first event group based on a first n observed failed sign in attempts and a second event group based on a next n failed sign in attempts. In some embodiments, the system may be configured to identify the two event groups for merger. Alternatively, in some embodiments, separate event groups for two different but related IP addresses may have been generated, and may result in the event groups being merged for more efficient processing, e.g., to avoid duplicative process and/or to provide a coordinated report and/or other response. If candidate event groups to be merged are found to satisfy criteria to be merged (504), the event groups are merged (506). The process of FIG. 5 continues until done (508), e.g., there are no more candidate event groups to be checked.

Figure 6:
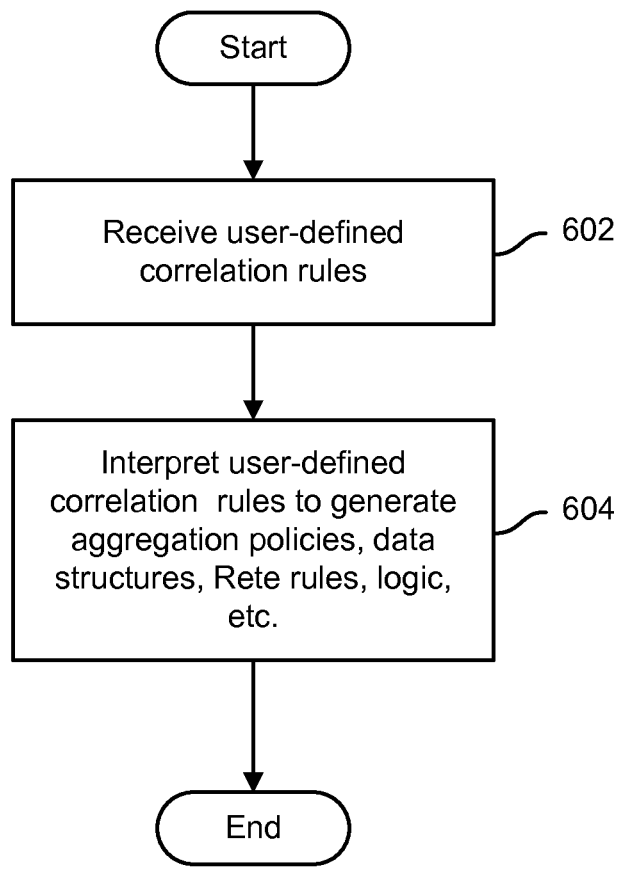
FIG. 6 is a flow chart illustrating an embodiment of a process to generate aggregation policies based on user-defined correlation rules.

FIG. 6 is a flow chart illustrating an embodiment of a process to generate aggregation policies based on user-defined correlation rules. In various embodiments, the process of FIG. 6 may be performed by an aggregation engine, such as aggregation engine 110 of FIG. 1. In the example shown, user-defined correlation rules are received (602). For example, aggregation policies 112 of FIG. 1 may be defined by one or more users, e.g., using a constraint-based language as described above. The user-defined rules are parsed and interpreted programmatically to generate aggregation policies, data structure, logic, etc. (604), to be applied to streams of event data as received to identify events that satisfy applicable correlation rules.

In various embodiments, combining and integrating an aggregation engine and a Rete-based inference engine, as disclosed herein, enables the benefits of both types of system to be realized to provide a correlation engine capable of handling in an efficient manner very large volumes of event data received in event streams from reporting systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of correlating streaming event data, comprising:
   receiving event data from one or more source systems;
   executing, using an aggregation engine, at least one aggregation policy programmatically based on one or more predefined correlation rules to:
   generate event groups;
   associate the event data with event groups, two or more events associated with an event group based on the one or more aggregation policies;
   link a plurality of event data with a plurality of event groups based on the one or more aggregation policies;
   create a temporary data structure for each event group;
   populate the temporary data structure for each event group with event data, creating linked temporary data structures;
   determine if the one or more aggregation policies are satisfied;
   store the plurality of event groups as facts in a working memory of a Rete engine;
   applying, using the Rete engine, Rete rules to the facts in the working memory, the Rete rules derived, at least in part, using the predefined correlation rules;
   dynamically updating at least one selected from a group comprising the temporary data structure and the event groups in working memory based on a subsequently received event data;
   wherein the predefined correlation rules comprises: at least one grouping clause, and at least one correlation constraint, at least one filtering clause, and at least one having clause;
   wherein the at least one correlation constraint comprises a join constraint, sequencing constraint, and a free form constraint.

2. The method of claim 1, wherein each of said source systems is configured to generate and provide to the aggregation engine discrete event data associated with that source system.

3. The method of claim 1, wherein said source systems comprise an installed base of systems and said event data comprises system log data.

4. The method of claim 1, wherein said correlation rules comprise user-defined rules.

5. The method of claim 1, further comprising deriving one or more aggregation policies programmatically based at least in part on said correlation rules.

6. The method of claim 1, wherein the event groups comprise a first event group and further comprising merging the first event group with a second event group.

7. The method of claim 6, wherein the first event group is merged with the second event group based at least in part on a determination that a merger criterion is satisfied and the merger criterion is based on user-defined rules, wherein the first event group and the second event group are instantiated.

8. The method of claim 1, wherein the aggregation engine is configured to extract one or more key-value pairs from a received event and to discard at least an unused portion of the received event.

9. The method of claim 1, wherein the aggregation engine is configured to ignore and discard a received event that is determined to not be associated with an applicable correlation rule.

10. The method of claim 1, wherein the aggregation engine is configured to associate a timestamp with an instance of received event data and to use the timestamp to apply one or more of said correlation rules, wherein the timestamp is used to determine how long to keep event data and/or to reorder events received out of order based on a rolling window size specified in applicable correlation rules.

11. The method of claim 10, wherein the timestamp is used to implement a sliding window associated with one or more of said correlation rules.

12. The method of claim 1, wherein a change in at least one rule of the Rete rules causes a change to at least one event group.

13. A system to correlate streaming event data, comprising:
    a communication interface; and
    a processor coupled to the communication interface and configured to:
    receive event data from one or more source systems;
    execute at least one aggregation policy programmatically based on one or more predefined correlation rules to:
    generate event groups;
    associate the event data with event groups, two or more events associated with an event group based on the one or more aggregation policies;
    link a plurality of event data with a plurality of event groups based on the one or more aggregation policies;
    create a temporary data structure for each event group;
    populate the temporary data structure for each event group with event data, creating linked temporary data structures;
    determine if the one or more aggregation policies are satisfied;
    store the plurality of event groups as facts in a working memory of a Rete engine;
    applying, using the Rete engine, Rete rules to the facts in the working memory, the Rete rules derived, at least in part, using the predefined correlation rules;
    updating at least one selected from a group comprising the temporary data structure and the event groups in working memory based on a subsequently received event data;
    wherein the predefined correlation rules comprises: at least one grouping clause, and at least one correlation constraint, at least one filtering clause, and at least one having clause;
    wherein the at least one correlation constraint comprises a join constraint, sequencing constraint, and a free form constraint.

14. The system of claim 13, wherein said correlation rules comprise user-defined rules.

15. The system of claim 13, wherein the event groups comprise a first event group and further comprising merging the first event group with a second event group.

16. The system of claim 13, wherein the processor is configured to extract one or more key-value pairs from a received event and to discard at least an unused portion of the received event.

17. The system of claim 13, wherein the processor is configured to ignore and discard a received event that is determined to not be associated with an applicable correlation rule.

18. The system of claim 13, wherein a change in at least one rule of the Rete rules causes a change to at least one event group.

19. A computer program product to correlate streaming event data, the computer program product being embodied in a non-transitory computer readable medium and comprising computer instructions for:
  receiving event data from one or more source systems;
  executing at least one aggregation policy programmatically based on one or more predefined correlation rules to:
    generate event groups;
    associate the event data with event groups, two or more events associated with an event group based on the one or more aggregation policies;
    link a plurality of event data with a plurality of event groups based on the one or more aggregation policies;
    create a temporary data structure for each event;
    populate the temporary data structure for each event group with event data, creating linked temporary data structures;
    determine if the one or more aggregation policies are satisfied;
    store the plurality of event groups as facts in a working memory of a Rete engine;
    applying, using the Rete engine, Rete rules to the facts in the working memory, the Rete rules derived, at least in part, using the predefined correlation rules;
    dynamically updating at least one selected from a group comprising the temporary data structure and the event groups in working memory based on a subsequently received event data;
  wherein the predefined correlation rules comprises: at least one grouping clause, and at least one correlation constraint, at least one filtering clause, and at least one having clause;
  wherein the at least one correlation constraint comprises a loin constraint, sequencing constraint, and a free form constraint.

20. The computer program product of claim 19, wherein a change in at least one rule of the Rete rules causes a change to at least one event group.

\* \* \* \* \*